(12) United States Patent
Terrell

(10) Patent No.: US 9,121,321 B2
(45) Date of Patent: Sep. 1, 2015

(54) EXHAUST SYSTEM PASSIVE NOISE CANCELLATION ASSEMBLY AND METHOD

(71) Applicant: Rufus Larry Terrell, Marietta, GA (US)

(72) Inventor: Rufus Larry Terrell, Marietta, GA (US)

(*) Notice: Subject to any disclaimer, the term of this patent is extended or adjusted under 35 U.S.C. 154(b) by 0 days.

(21) Appl. No.: 14/327,177

(22) Filed: Jul. 9, 2014

(65) Prior Publication Data

US 2015/0184564 A1 Jul. 2, 2015

Related U.S. Application Data

(60) Provisional application No. 61/922,232, filed on Dec. 31, 2013.

(51) Int. Cl.
| | |
|---|---|
| *F16F 7/104* | (2006.01) |
| *F16F 15/04* | (2006.01) |
| *F01N 1/16* | (2006.01) |
| *F16F 7/00* | (2006.01) |
| *F16F 15/00* | (2006.01) |

(52) U.S. Cl.
CPC ........................................ *F01N 1/16* (2013.01)

(58) Field of Classification Search
CPC ............ F16F 7/00; F16F 7/10; F16F 7/1028; F16F 7/104; F16F 15/04; F16F 15/063; F16F 15/06; F16F 1/12; F16C 11/12
USPC .......... 181/207, 209; 267/160, 164, 178, 179; 188/378, 379, 380

See application file for complete search history.

(56) References Cited

U.S. PATENT DOCUMENTS

| | | | | |
|---|---|---|---|---|
| 1,063,385 A | * | 6/1913 | Reed | 181/207 |
| 2,852,595 A | * | 9/1958 | Thurston | 174/42 |
| 3,314,503 A | * | 4/1967 | Neubert | 188/379 |
| 3,756,351 A | * | 9/1973 | Sasaki | 188/378 |
| 3,971,447 A | * | 7/1976 | Ahlberg et al. | 173/128 |
| 4,296,839 A | * | 10/1981 | Peller et al. | 188/378 |
| 4,576,356 A | * | 3/1986 | Kucera | 248/559 |
| 4,852,848 A | * | 8/1989 | Kucera | 248/559 |
| 5,070,802 A | * | 12/1991 | Corlett | 114/99 |
| 5,193,644 A | * | 3/1993 | Hart et al. | 181/207 |
| 5,229,556 A | | 7/1993 | Geddes | |
| 5,230,407 A | * | 7/1993 | Smith et al. | 188/281 |

(Continued)

FOREIGN PATENT DOCUMENTS

| | | | | |
|---|---|---|---|---|
| FR | 2472949 | * | 1/1980 | B01J 1/20 |
| JP | 58144224 A | * | 8/1983 | G05D 19/00 |

(Continued)

*Primary Examiner* — Edgardo San Martin

(74) *Attorney, Agent, or Firm* — Daniel Boudwin; Global Intellectual Property Agency LLC

(57) ABSTRACT

Disclosed is a passive noise cancelling assembly suitable for reducing exhaust drone from an exhaust system, whereby one or more tuning rods or tuning assemblies are disposed between two exhaust pipes of the system to cancel out or shift the target frequencies thereof. One or more elongated tuning rods are sandwiched between a first and second support plate, wherein a carrier rod extends through the assembly and connects to the exhaust pipes at its ends. An alternative embodiment contemplates smaller tuning rod subassemblies that include shorter tuning rods and a pair of support plates, whereby several subassemblies are supported along a single support rod. The modes of the assembly are controlled by the stiffness of the tuning rods, and its connection between the exhaust pipes attenuates exhaust modes creating audible drone.

9 Claims, 5 Drawing Sheets

(56) References Cited

U.S. PATENT DOCUMENTS

| | | |
|---|---|---|
| 5,233,137 A | 8/1993 | Geddes |
| 5,541,373 A | 7/1996 | Cheng |
| 5,619,020 A | 4/1997 | Jones |
| 6,098,969 A * | 8/2000 | Nagarajaiah ................. 267/136 |
| 7,086,509 B2 * | 8/2006 | Cunningham et al. ........ 188/378 |
| 7,690,872 B2 * | 4/2010 | Hashimoto et al. .......... 409/141 |
| 7,707,787 B2 * | 5/2010 | Kazama et al. .............. 52/167.2 |
| 8,677,699 B2 * | 3/2014 | Tagawa ....................... 52/167.8 |
| 8,752,811 B2 * | 6/2014 | Mischler ...................... 267/137 |
| 2013/0233642 A1 | 9/2013 | Abram et al. |

FOREIGN PATENT DOCUMENTS

| | | | | |
|---|---|---|---|---|
| JP | 59026641 A | * | 2/1984 | ............. F16F 15/02 |
| JP | 06083370 A | * | 3/1994 | ............. G10K 11/16 |

* cited by examiner

EXHAUST SYSTEM PASSIVE NOISE CANCELLATION ASSEMBLY AND METHOD

CROSS REFERENCE TO RELATED APPLICATION

This application claims the benefit of U.S. Provisional Application No. 61/922,232 filed on Dec. 31, 2013, entitled "Drone Amplitude Reducer." The above identified patent application is herein incorporated by reference in its entirety to provide continuity of disclosure.

BACKGROUND OF THE INVENTION

1. Field of the Invention

The present invention relates to vehicle exhaust systems and noise cancelling devices therefor. More specifically, the present invention is related to vehicle exhaust drone reducing assembly that attenuates or cancels target frequencies that cause audible droning in the system without restricting the flow of exhaust gas for performance vehicles.

Vehicle exhaust systems are designed to evacuate exhaust gases from the engine after combustion, whereby the exhaust gases are rapidly withdrawn from the engine combustion chamber, into the exhaust manifold and through the exhaust system to the atmosphere. To maintain peak performance of an engine, the flow of air through the engine must flow freely through the system and not be hampered by high pressure areas or physical blockages. This includes excessive backpressure on the exhaust system, which stifles the flow of exhaust gas exiting the engine.

Most modern cars include complicated exhaust systems comprised of catalytic converters, advanced muffler systems, particulate traps, and other assemblies within the system that reduce the otherwise free flow of air. While these devices reduce harmful emissions, they create encumbrances on the system that reduce its efficiency. To improve engine performance for the high performance vehicles, these exhaust systems are optimized for efficient air flow so as to eliminate as much back pressure as possible so that engine performance can be maximized.

However, a drawback associated with many aftermarket, non-OEM exhaust systems is that they tend to be less developed than most factory or original equipment systems, and therefore tend to include unwanted effects such as increased noise production. One common type of audible effect known in the art is exhaust "drone", in which the exhaust system emits a high amplitude, low frequency tone that is not pleasing to the ear and can be a nuisance to the driver and others. Drone is a result of the moving exhaust gases interacting with the exhaust system components, wherein one or more components experience an excitation in close proximity to a system or component resonant frequency. This in turn creates a steady, high amplitude noise at certain engine speeds, which can be pervasive in the vehicle interior and particularly loud outside of the vehicle.

The drone created by most exhaust systems is a nuisance for the vehicle occupants, particularly over long trips, as well as to nearby pedestrians. Moreover, the vibrations that cause the drone and can create turbulence in the exhaust gases within the system, thereby increasing backpressure, reducing horsepower and interfering with optimal engine performance across its speed range. It is well known that exhaust drone is a byproduct of the vehicle exhaust components, including their size, weight, and positioning. It is also a byproduct of the connection between the vehicle and the system itself. The exhaust system components include, inter alia, catalytic converters, resonators, mufflers, exhaust tips, lengths of exhaust tubing, hangers and other coupling components. All of these individual parts collectively and individually have a frequency at which they will resonate. The frequency of engine cycling through its stages and the excitation energy of the pulses generated thereby contribute to exhaust drone, which can range from tolerable to very intense, depending upon the setup.

Yet another cause of exhaust drone is unequal exhaust tubing length for dual exhaust vehicles. Unequal exhaust tubing means that exhaust gases traversing the system travel in one of two paths, wherein one path is longer than the other. This leads to complex frequencies that are difficult to counteract and attenuate. Unfortunately, the drone range for most vehicle exhaust systems is generally within the ranges of normal city and highway driving, therefore the prevalence of exhaust drone is common in aftermarket systems, and countering the noise can be quite difficult.

The present invention relates to an energy attenuation system that is adapted to connect between the two runs of an exhaust system and connect to two points therealong. The system absorbs excitation energy between the exhaust runs and creates an anti-phase vibration that effectively cancels the vibration and thus the audible signal generated by the system. By contrast to most existing systems, which utilize active noise cancelling, the present invention is a structure attached to the exhaust system for canceling the noise source without requiring electrical power. The structure is tuned for a specific range of frequencies and operates as a passive noise attenuation device without adding speakers or resonators to the system.

2. Description of the Prior Art

Devices have been disclosed in the prior art that relate to noise cancelling systems. These include devices that have been patented and published in patent application publications, and generally relate to active noise control systems that utilize speaker systems drawing electrical power to cancel drone and other unwanted noise. The following is a list of devices deemed most relevant to the present disclosure, which are herein described for the purposes of highlighting and differentiating the unique aspects of the present invention, and further highlighting the drawbacks existing in the prior art.

Solutions in the art include both passive and active sound cancelling solutions. Passive solutions include resonators and specifically designed structures that do not have overlapping resonant frequencies. Active sound cancelling includes audio systems that can react to the unwanted sound and project an anti-phase noise source to cancel out the unwanted sound. These solutions are effective at attenuating or preventing exhaust noise in the art, however these add weight and complexity to the vehicle exhaust system, as well as significant costs.

Active noise cancelling systems in the art include those that employ speakers or other noise generators in the exhaust system to project anti-phase sound to cancel out the unwanted noise. Solutions such as these exist in the art. Examples include U.S. Pat. No. 5,541,373 to Cheng and U.S. Pat. No. 5,229,556 to Geddes. Both of these devices employ an active exhaust silencer, wherein a chamber is provided having one or more speakers for actively cancelling out a noise frequency in the exhaust system. U.S. Pat. No. 5,619,020 to Jones is another device in the art, which discloses an active noise cancelling assembly that is disposed within the muffler of a vehicle and includes loudspeakers injecting anti-noise thereinto.

These systems are effective for cancelling noise sources within an exhaust system, however they require sophisticated electronics and fragile components to operate effectively. These include loudspeakers and supporting electronics, as well as microphones in some instances to monitor the exhaust noises and change the anti-phase noise to cancel the same. Such systems are expensive and prone to failure over long durations. The present invention, by contrast, is a passive noise cancelling system that utilizes physical structure to attenuate frequencies in the exhaust and change is sound qualities for the purposes of cancelling unwanted drone.

Specifically, the present invention contemplates an assembly suitable for use with an exhaust system having dual exhaust outlets from the vehicle engine, regardless of whether the rear of the vehicle has a dual exhaust outlet or a rejoined, single outlet. The assembly is placed between two exhaust paths and connected therebetween such that vibration of the system is neutralized by tuning the structure of the present invention to attenuate dominate frequencies in the exhaust. The assembly comprises a series of tuning rods disposed between end plates and connected to portions of the exhaust pipe at its ends, wherein the tuning rods are stiffened such that the resonate frequency thereof and of the system offsets the drone frequency of the exhaust system. The compression within the rods changes their stiffness and thus the frequency response thereof, thereby changing the modes of the assembly. The system can be setup such that these modes are anti-phase to the exhaust modes, thereby attenuating the drone emanating therefrom.

It is submitted that the present invention improves the art of passive noise cancelling solutions in the art. Current methods of addressing drone using a passive noise cancelling means include attaching different types and styles of resonators to the system, using specific muffler designs, attaching resonating exhaust tips to the ends of the exhaust system, and further employing various methods that adjust the weight of the system in critical locations, whereby changing the exhaust system characteristics. These existing methods often improve exhaust drone to some degree, but also change the tone and "character" of the vehicles exhaust. Some of these methods, such as replacing the muffler, can negatively impact a cars performance. The present invention provides a solution for vehicle exhaust systems, whereby the flow of exhaust gases is not changed and the anti-phase frequency can be "dialed-in" for specific exhaust systems.

The present invention diverges in design elements and structure from the prior art, and consequently fulfills a need in the art for improved passive noise cancelling means within an exhaust system. The present invention fulfills this need without the drawbacks of the prior art, which include more complex systems and those that potentially interfere with the operation of the exhaust or change its sound qualities while attempting to remove drone modes.

SUMMARY OF THE INVENTION

In view of the foregoing disadvantages inherent in the known types of noise cancelling devices for vehicle exhaust systems now present in the prior art, the present invention provides a new passive noise cancelling system that is adapted for use with a vehicle exhaust system to eliminate exhaust drone therefrom without interfering with the normal operation of the exhaust.

It is therefore an object of the present invention to provide a new and improved noise cancelling system that has all of the advantages of the prior art and none of the disadvantages.

It is another object of the present invention to provide a noise cancelling system to provide an arrangement of elongated tuning rods that are used to attenuate exhaust drone from a vehicle exhaust.

Another object of the present invention is to provide a noise cancelling system that is deployed between a pair of exhaust pipes and is specifically suited for exhaust setups having a dual path from the vehicle engine.

Yet another object of the present invention is to provide a noise cancelling system that utilizes tuning rods or tuning assemblies to cancel out the drone modes of the exhaust system, wherein the noise cancelling system is a passive device requiring no speakers or electronics to operate effectively.

Another object of the present invention is to provide a noise cancelling system that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
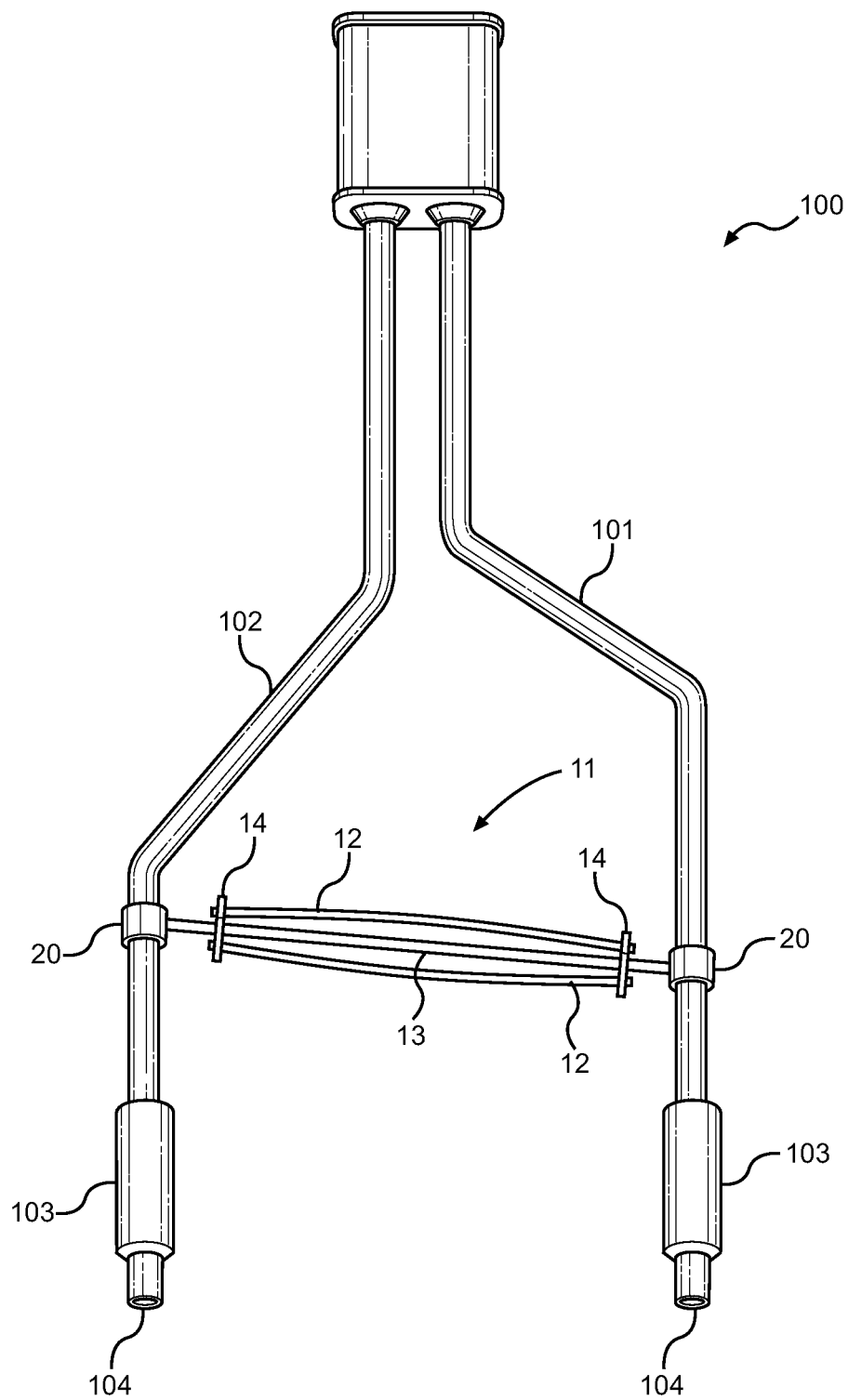
FIG. 1 shows an overhead view of a typical dual exhaust system behind the catalytic converter, wherein the noise cancelling system of the present invention is deployed between exhaust paths under the vehicle.

Reference is made herein to the attached drawings. Like reference numerals are used throughout the drawings to depict like or similar elements of the passive exhaust drone cancelling system of the present invention. For the purposes of presenting a brief and clear description of the present invention, the preferred embodiment will be discussed as used for eliminating exhaust drone from a vehicle with a dual exhaust system. Dual exhaust refers to the number of exhaust paths just rear of the engine and not the exhaust tips disposed along the rear of the vehicle. The figures are intended for representative purposes only and should not be considered to be limiting in any respect.

Referring now to FIG. 1, there is shown an overhead view of a typical dual exhaust setup for a passenger vehicle, wherein a first 101 and second 102 exhaust pipe is disposed behind the catalytic converter to increase the overall cross section of the exhaust system for reduced drag on the system. Each of the pipes terminates along the rear of the vehicle at an exhaust end 104, whereby a muffler or silencer 103 is placed just upstream thereof to reduce engine noise emanating from the vehicle. Typical exhaust systems are suspended from the vehicle chassis using several brackets and clamps, wherein the exhaust pipes are routed along the underbody of the vehicle for the purposes of providing a conduit for exhaust gases from the vehicle engine. The goal of the exhaust system is to treat the exhaust gases to reduce harmful emissions, to reduce engine noise, and to allow the efficient escape of exhaust gases from the engine.

Many high performance exhaust systems are free-flowing and are optimized for maximum air flow. However these systems can exhibit frequencies that can be excited by the speed of the engine through its rev range, and even during idle. The target frequencies of the present invention are those that cause the exhaust system to resonate. The target frequencies are those that are aligned with the vehicle engine firing rate, which is typically in the area of 133 Hz. This frequency causes an excitation through the exhaust system that causes the exhaust pipes to resonate at 95 Hz to 105 Hz. These resonant frequencies sometimes create a low frequency "drone" that is loud and unwanted. Causes include the structure of the exhaust system and the manner in which it is supported. The present invention contemplates a tuning assembly that attenuates or effectively offsets these resonate frequencies, wherein a noise reduction assembly 11 is disposed between a first 101 and second 102 exhaust pipe of a dual exhaust setup.

The present invention is a passive noise cancelling system that comprises one or more tuning rods 12 sandwiched between a first support plate 14 and a second support plate 14. The support plates 14 are supported by a carrier rod 13 that extends through the assembly and is supported at its ends via clamps 20 that connect to the vehicle exhaust pipes. The connection transfers vibrations into the assembly from the exhaust system, and vice versa. The elongated tuning rods 12 are round members having an elongated length, whereby the ends thereof are clamped by the support plates 14 via a fastener. The support plates 14 are used to apply compression to the tuning rods 12, thereby displacing the tuning rods 12 into a bowed shape, whereby the support plates 14 and fastener supporting the tuning rods 12 apply a column loading to the rod 12. This displacement cases the stiffness of the rod 12 to change, which alters its modal frequencies and the overall stiffness of the assembly 11.

FIG. 1 illustrates the assembly 11 deployed along the end of the exhaust run and just prior to the exhaust ends 104. However, it is contemplated and it has been shown that the assembly 11 is effective at reducing exhaust system drone when the system 11 is deployed between a first 101 and second 102 exhaust pipe upstream of the catalytic converter and along the initial portions of the exhaust system closer to the vehicle engine. The assembly 11 attaches between the first 101 and second 102 exhaust pipe further upstream to attenuate frequencies of the exhaust system.

Figure 2A:
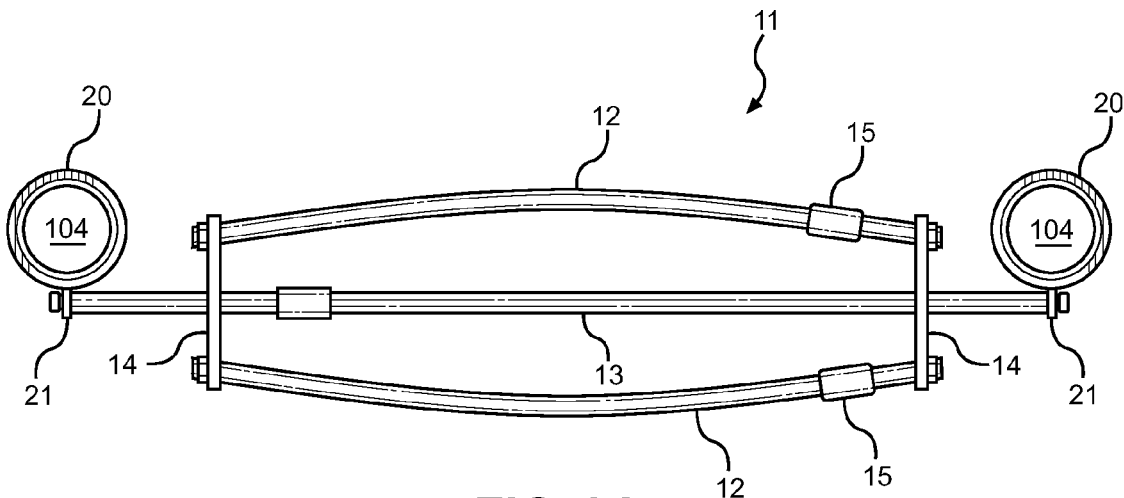
FIG. 2A shows an end view of a dual exhaust system and the elongated tuning rods of the present invention in a working state.
Figure 3A:
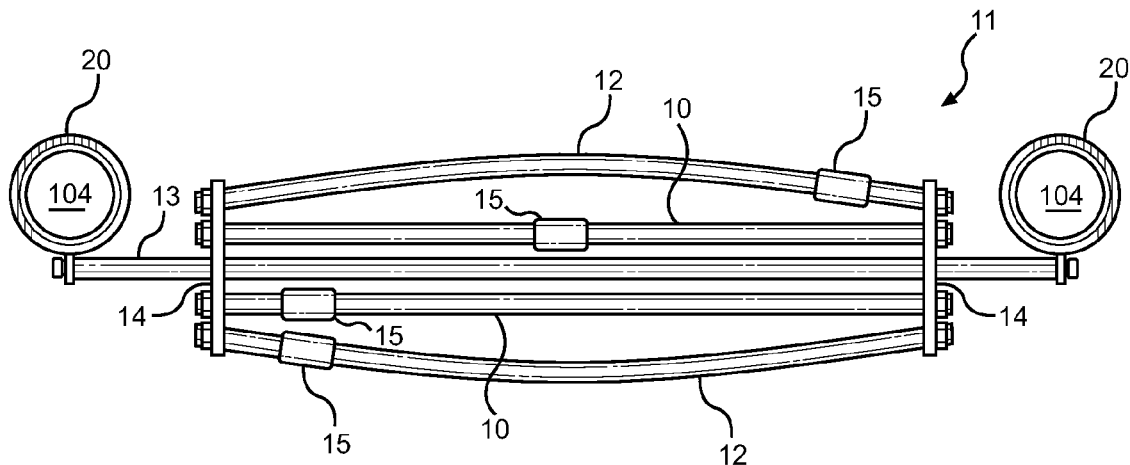
FIG. 3A shows an end view of a dual exhaust system and an embodiment of the elongated tuning rods of the present invention in a working state.

Referring to FIGS. 2A and 3A, there are shown two configurations of the present invention, wherein one or more tuning rods 12 are positioned between opposing support plates 14 and a carrier rod 13 supports the system between two exhaust pipes. As shown, the carrier rod 13 extends between a first and second exhaust pipe clamp 20, wherein the ends 21 of the carrier are supported therefrom and vibration from the exhaust pipes travels through the carrier and into the assembly 11. The assembly 11 is one comprising one or more tuning rods 12 compressed between a pair of end carrier plates 14, whereby the rods 12 are sufficiently compressed to cause radial displacement thereof. This displacement increases the stiffness, wherein the stiffness of each rod can therefore be tuned such that its modes are within a desired range. These modes are adapted to be set up to offset or be anti-phase to the drone frequencies of the exhaust, whereby the exhaust frequencies act as an input to the assembly 11 and the tuning rods 12 vibrate to cancel out the excitation frequencies received through the carrier rod 13.

The tuning rods 12 are adjusted by way of fastener nuts along the support plates 14, wherein the rods 12 includes threaded portions (a threaded body) and the nuts compress the rods 12 between the support plates 14. The support plates 14 include apertures adapted to support the rods 12 therethrough. Similarly, the support plates 14 are supported by fastener nuts along the carrier rod, which is similarly threaded. This allows the distance between the support plates 14 to be adjusted, thereby adjusting the compression on the rods 12 and changing their frequency response.

Along with adjusting the fastener nuts for each rod 12 and adjusting the position of the support plates 14, there is also contemplated secondary adjustment elements 15 along each tuning rod 12 and along the carrier rod 13. The secondary adjustment elements 15 may comprise one of several devices that add fine tuning to the assembly without making large scale positional changes of the assembly. Specifically, these items include turnbuckles that are used to adjust overall length of the carrier rod or tuning rods. Turnbuckles are useful for making small changes to the overall length of the rods, whereby the rods are comprised of a first and second threaded rod joined by the turnbuckle. Alternatively, the secondary adjustment elements 15 may comprise one or more weights that are added to the threaded rods, whereby the position of the weights changes the frequency response of each tuning rod 12. Furthermore, the elements 15 may be compression springs between a first and second threaded rod joined to form each elongated tuning rod 12. Overall, these elements 15 serve as a secondary tuning means to "dial-in" the desired frequency response of the assembly 11 without making drastic changes.

Referring specifically to FIG. 3A, there is shown an assembly 11 with a pair of outer tuning rods 12, a carrier rod 13, support plates, and an pair of secondary tuning rods 10 disposed between the outer tuning rods 12 and the inner carrier rod 13. These secondary tuning rods 10 undergo less compression and add weight to the system, and can be used to make fine adjustments to the frequency response of the assembly. These rods 10 may comprise a different material than the tuning rods 12, and provide the user with more ways to finely tune the assembly 11 to counter exhaust drone when installed.

Along with tuning the stiffness of the assembly, its orientation relative to the dual exhaust pipes can be adjusted to compensate different length pipes and therefore different frequencies of vibration. As shown in FIG. 1, the carrier rod 13 may be supported directly between the two pipes 101, 102, or on a diagonal. Because the length of each pipe 101, 102 is different and follows its own path, the modal frequencies of each exhaust pipe may vary. Therefore, placement of the clamps 20 at different points along the pipes and different offsets from the terminals ends 104 thereof can greatly increase the ability of the installer to correctly offset and cancel drone noise. The clamps 20 may support the carrier rod 13 at a desired angle to support this diagonal configuration. Each of the pair of clamps includes a rounded construction with a central axis therethrough, whereby each clamp is adapted to support the carrier rod at a desired angle with respect to the clamp central axis.

Figure 2B:
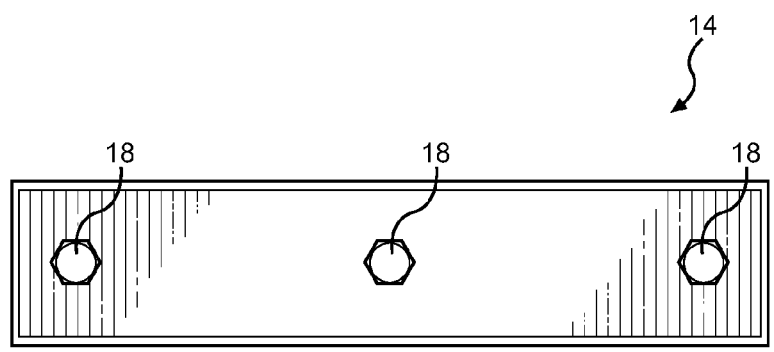
FIG. 2B shows an end view of one embodiment of the tuning rod support plate disposed along the ends of the device.
Figure 3B:
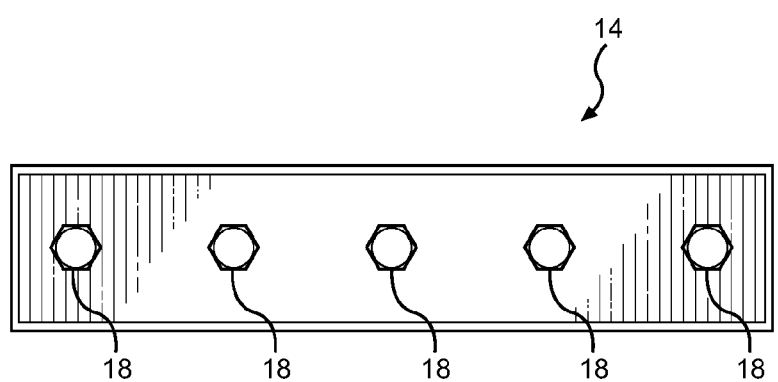
FIG. 3B shows an end view of another embodiment of the tuning rod support plate disposed along the ends of the device.

Referring now to FIGS. 2B and 3B, there is shown end views of the support plates 14 of the present invention. The support plates 14 are planar structures that comprise a plurality of apertures 18 therethrough. The apertures support the elongated tuning rods, carrier rod, and any secondary tuning rods therethrough. A pair of the support plates 14 caps the ends of the elongate tuning rods and provides a support that compresses the rods to control their stiffness and therefore their frequency response.

Figure 4:
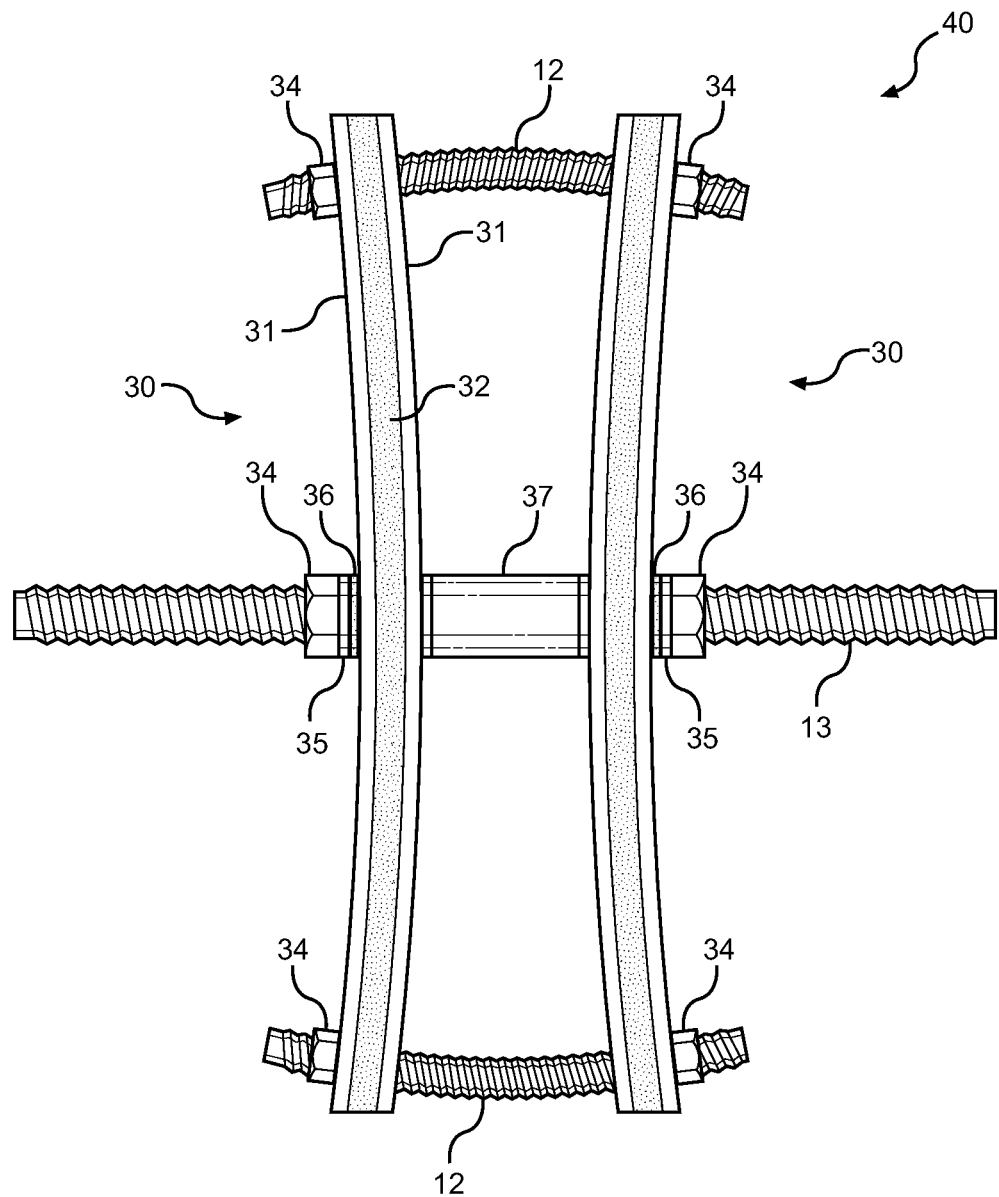
FIG. 4 shows a second embodiment of the present invention, in which the tuning rods are shorter and disposed within a smaller tuning rod subassembly.

Referring now to FIG. 4, there is shown a view of an alternate embodiment of the present invention, wherein the assembly comprises a more compact tuning subassembly 40 supported by the carrier bar 13 between dual exhaust pipes. The subassembly 40 comprises at least two tuning rods 12 positioned between composite support plates 30. The composite support plates 30 comprise multi-layered plates that are adapted to support the tuning rods 12 therebetween. Tuning rod fastener nuts 34 apply compression on the tuning rods 12, while carrier fastener nuts 34 apply a shear load against the composite plates 30 at their center point. This deforms the plates 30 such that they exhibit a bowed shape, while the elongated rods are similarly displaced. Both of these displacements define the stiffness of the subassembly and therefore its frequency response. Between the carrier nuts 34 and the plates 30 are a washer 35 and a neoprene O-ring 36, while between the two plates 30 is an insert 37 or bushing. The composite plates 30 preferably comprise a pair of outer aluminum layers 31 sandwiching a center tuning plate of steel material 32. The use of different materials and material dimensions improve the strength of the plates 30, whereby the center tuning plate is used to facilitate increased yield characteristics and improved lower temperature range performance.

Figure 5:
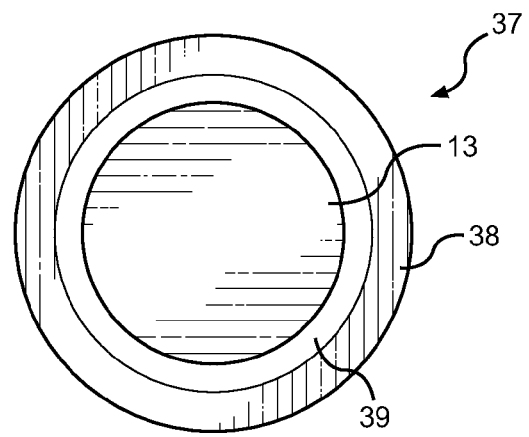
FIG. 5 shows the construction of the interior bushing elements within the interior of the smaller tuning rod subassemblies.

Referring now to FIG. 5, there is shown a cross section view of the interior insert 37 of the tuning subassembly. This insert preferably comprises an outer metallic tube 38 having an open interior and a nylon insert 39 therein positioned about the carrier rod 13. The composite support plates 30 bear against the insert 37, which is disposed therebetween, while the outer carrier fastener nuts apply load against the outer portion thereof to maintain the center portion of the plates 30 along the carrier rod 13 as the tuning rods 12 act on the ends of the plates 30 and displace them outwards. The O-rings extend through the apertures of the plates 30 such that the plates are not in direct contact with the carrier rod and the gap is filled with a flexible, elastomeric material.

Figure 6:
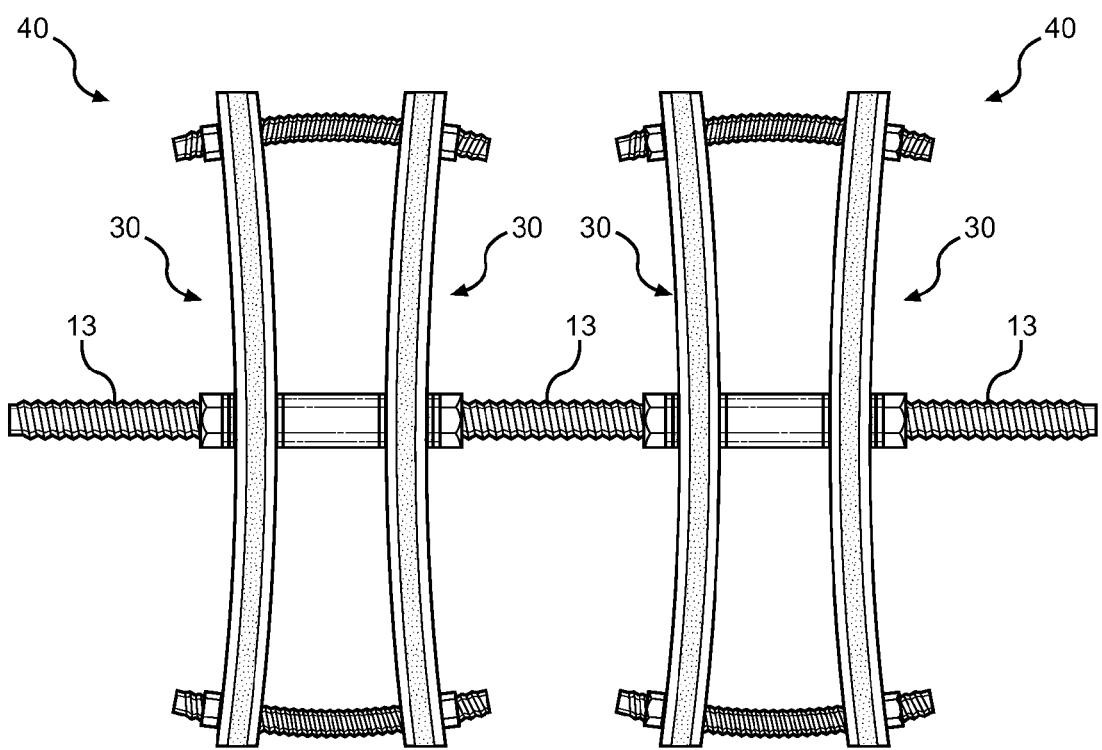
FIG. 6 shows a view of two tuning rod subassemblies in connection and supported by a singular carrier rod.

Referring now to FIG. 6, there is shown a view of multiple tuning subassemblies 40 disposed on a single carrier rod 13, whereby the carrier rod 13 is supported by clamps at its ends such that the carrier rod connects to the exhaust pipes of the vehicle. One or more of the subassemblies is adapted to be placed on the carrier rod 13, whereby the frequencies thereof can be adjusted individually and the overall system may have several modal frequencies that can counteract exhaust drone. Each of the composite plates 30 includes an inherent stiffness as defined by the load placed thereon and the displacement created by the tuning rods therebetween.

Overall, the present invention provides a means to attenuate and cancel frequencies in the exhaust system that lead to audible drone, whereby the amplitude of the exhaust vibration is reduced and offset by the anti-phase vibration of the noise cancelling assembly or subassemblies. Excluding what differences there may be in the lengths of the exhaust tubes and non-uniform irregularities between them, the vibrations one exhaust path are the same as those in a second exhaust path; there is simply a slight phase shift due to the firing order of the engine. Connection of the tuning rods to support plates and stiffening the tuning rods such that their ends are compressed between the plates creates a stiffness that facilitates the transfer of the mechanical energy of the vibrations between the two exhaust paths. In one working prototype and by way of example, the optimum range of stiffness in a thirty-six (36) inch tuning assembly is 2.5"-4.0" tuning rod deflection, measured from the apex of the tuning rod arc to the stabilizing bar (center to center). Delivering the vibration (mechanical) from one exhaust path to the other, before or during the vibration cycle in the second exhaust pipe and out of phase with vibration in the second exhaust pipe is a key function of present invention.

The out of phase vibrations from the exhaust pipes present themselves to the tuning and stabilizer rods as longitudinal waves traveling in opposite directions through the same medium (the tuning assembly), which cancel each other by a degree determined by the phase difference and the amplitudes of the vibrations. This is known as "destructive interference" and is the secondary function of present invention. Because of the differences in exhaust pipe lengths and the vehicle engine firing order, connecting a physical transfer medium between the different pipes and at a non-perpendicular angle yields a greater phase shift between the vibrations. The third function of present invention is the radiation of residual waves/vibration. This radiation is via transverse waves which are the residuals of the out of phase longitudinal wave undergoing destructive interference with each other.

Overall, the present invention provides an assembly that is adapted to reduce the amplitude of drone (humming) in a vehicle exhaust system by significant amounts without restricting exhaust flow. The present invention enhances engine performance by decreasing exhaust turbulence and offers the potential for improved delivered horsepower. The system is designed to function in conjunction with a dual exhaust vehicle, wherein "dual" refers to dual exhaust paths from the vehicle's engine and not the cars' dual exit pipes downstream therefrom. The present invention is adapted to function equally well with a dual or single exhaust exit. For a single exhaust pipe exit at the rear of the vehicle, the system is installed between two separate points along the exhaust prior to the pipes being joined (generally using a "Y" pipe) to a single pipe before reaching the exit point from the car's underside.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A passive noise cancelling assembly for a vehicle having an exhaust system, comprising:
   a carrier rod having a first and second end;
   a pair of clamps adapted to secure to an exhaust pipe of a vehicle, said clamps supports said first and second end of said carrier rod;
   a first and second support plate disposed along said carrier rod, said support plates comprising planar structures having one or more apertures therethrough;
   at least one tuning rod disposed between said first and second support plate;
   said at least one tuning rod having an elongated length between said first and second support plate, each elongated length being adjustable whereby each tuning rod is compressible between said first and second support plate whereby the stiffness of each tuning rod can be adjusted;
   said pair of clamps having a rounded construction with a central axis therethrough, each clamp adapted to support said carrier rod at a desired angle with respect to said central axis.

2. The passive noise cancelling assembly of claim 1, wherein:
   said at least one tuning rod comprises a threaded body and one or more threaded fastener nuts securing each rod to said support plate through said apertures;
   said carrier rod comprising a threaded body and one or more threaded fastener nuts securing said support plate to said carrier rod through said apertures.

3. The passive noise cancelling assembly of claim 1, further comprising one or more secondary adjustment elements disposed on said tuning rods or said carrier rod.

4. The passive noise cancelling assembly of claim 3, wherein said secondary adjustment elements comprise turnbuckles threadably supporting two rod portions of said carrier rod or of said tuning rod.

5. The passive noise cancelling assembly of claim 3, wherein said secondary adjustment elements comprise weights threadably supported along said carrier rod or said tuning rod.

6. The passive noise cancelling assembly of claim 3, wherein said secondary adjustment elements comprise compression springs threadably supporting two rod portions of said carrier rod or of said tuning rod.

7. The passive noise cancelling assembly of claim 1, further comprising one or more secondary tuning rods between said support plates and disposed between said tuning rods and said carrier rod.

8. The passive noise cancelling assembly of claim 1, wherein:
   said support plates each comprising a composite support plate of layered material;
   said composite support plates adapted to be displaced away from one another by said tuning rods and held statically along said carrier rod by carrier nuts threadably positioned along said carrier rod.

9. The passive noise cancelling assembly of claim 1, wherein:
   said support plates each comprising a composite support plate of layered material;
   said composite support plates adapted to be displaced away from one another by said tuning rods and held statically along said carrier rod by carrier nuts threadably positioned along said carrier rod;
   an interior insert disposed between said composite support plates along said carrier rod.

* * * * *